United States Patent [19]

Goldsmith et al.

[11] Patent Number: 4,679,329

[45] Date of Patent: Jul. 14, 1987

[54] COMBINED PRIMARY AND SECONDARY SINE BARS

[76] Inventors: Wesley R. Goldsmith, 3383 Moore St., Mar Vista, Calif. 90066; Joel E. Di Marco, 4288 Revere Pl., Culver City, Calif. 90230

[21] Appl. No.: 892,259

[22] Filed: Aug. 4, 1986

[51] Int. Cl.⁴ ............................................. G01B 3/56
[52] U.S. Cl. .................................................... 33/538
[58] Field of Search ................. 33/531, 534, 536, 537, 33/538

[56] References Cited

U.S. PATENT DOCUMENTS

| | | | |
|---|---|---|---|
| 2,533,890 | 12/1950 | King | 33/536 |
| 2,567,517 | 9/1951 | Keebler | 33/537 |
| 2,609,612 | 9/1952 | Mull | 33/538 |
| 3,862,498 | 1/1975 | Klucznik | 33/538 |
| 4,238,888 | 12/1980 | Goldsmith | 33/174 |
| 4,389,785 | 1/1983 | Goldsmith et al. | 33/174 |

FOREIGN PATENT DOCUMENTS 590862  7/1947  United Kingdom ................. 33/534

Primary Examiner—Richard R. Stearns
Attorney, Agent, or Firm—William H. Maxwell

[57] ABSTRACT

A primary and secondary sine-bar combination wherein one sine-bar has opposite end plugs shared with the other sine-bar, for compound determination of sine-bar angularity in degrees, minutes and seconds, using gage-blocks and/or micrometer adjustment within plus or minus one degree for height resolution in minutes and seconds.

26 Claims, 10 Drawing Figures

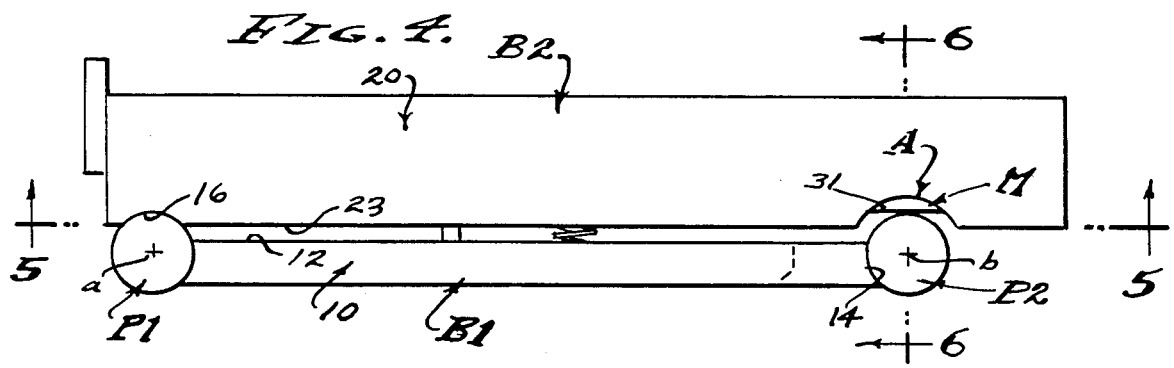
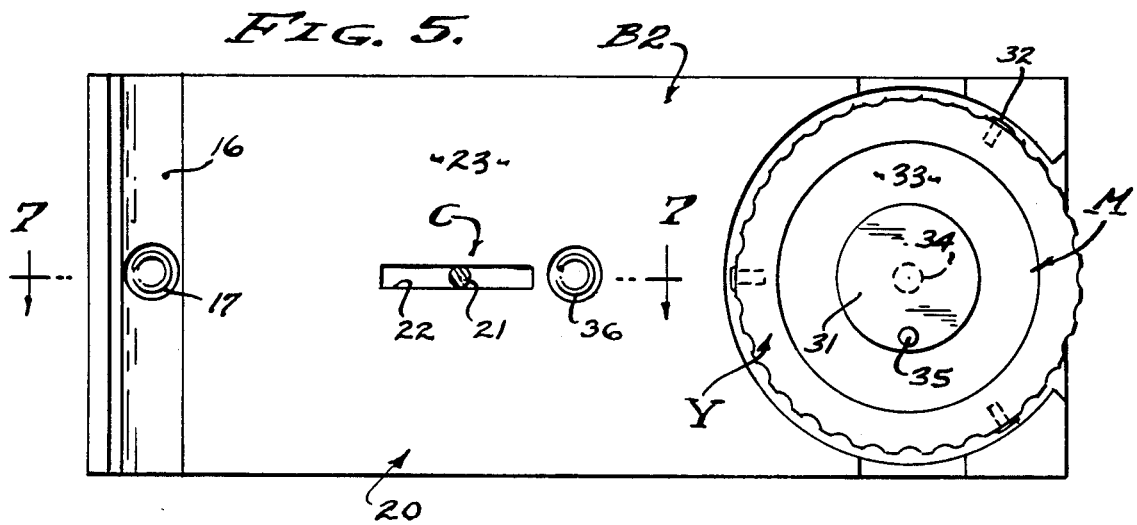
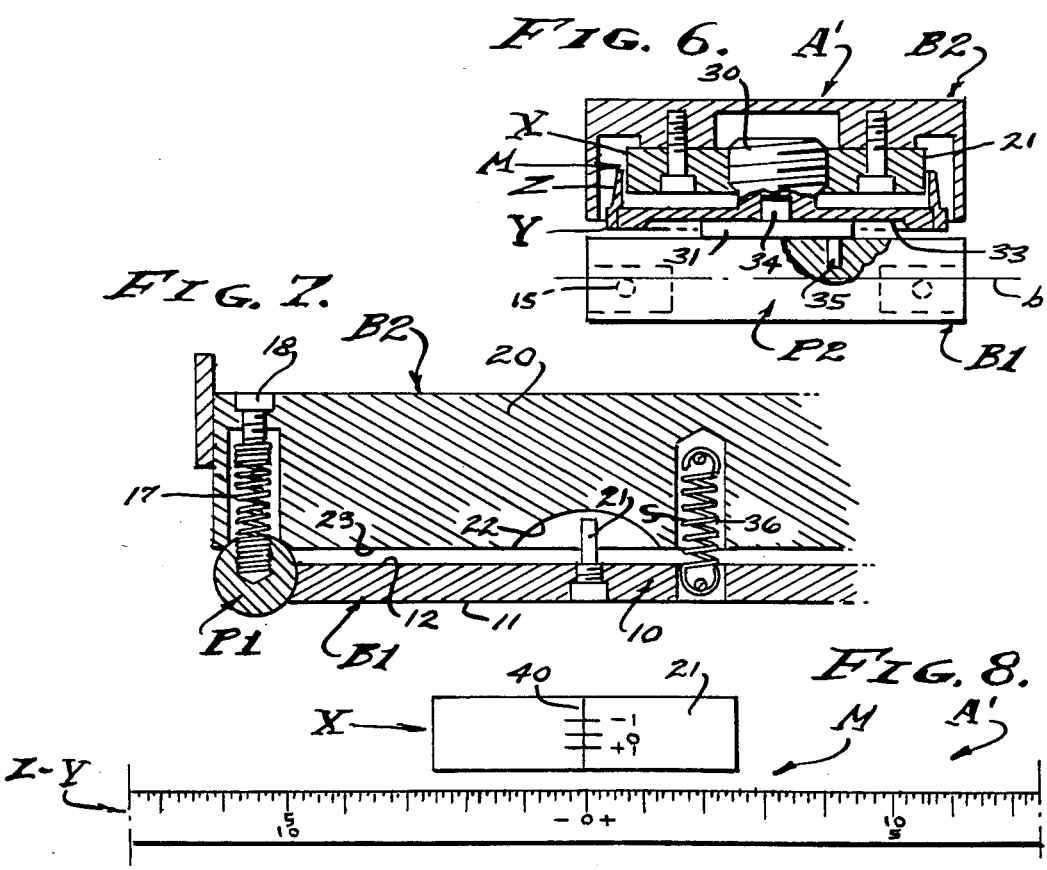

COMBINED PRIMARY AND SECONDARY SINE BARS

BACKGROUND

The sine-bar is used for angular measurements or for the location of work at given angles, as for example in measuring or checking angles with accuracy using precision gage-blocks selected for whatever dimension is required in obtaining a given angle. Precision gage-blocks are used in sets comprising a specific number of blocks of different sizes determined mathematically so that particular heights can be obtained by combining selected blocks, two or more blocks being combined by "wringing" them together with a swivelling motion causing them to adhere one to the other. When combining blocks in this conventional way for a given dimension, the object is to use as few blocks as possible, the procedure being based upon successive elimination of the right hand digit of the desired dimension. For example, the combined blocks measuring 0.1002+0.124+0.450+3.00 equals 3.6742 inches. An accurate surface plate or master flat is always used in conjunction with a primary sine-bar in order to form the base from which the vertical measurements are made, with precision gage-blocks in English or Metric increments of measurement. A standard length for sine-bars is five inches (also ten inches) and there are tabulated constants that represent vertical heights H for setting a five inch sine-bar (also for ten inch bars) to the required angle. Assuming that the required angle is 31° 20', the sine tables show that the height H should equal 2.6001 inches. Note that the constants in the sine tables equal five times the sine of angle: Thus the sine of 31° 20' in the trigonometric function table is 0.52002, and 0.52002×5 equals 2.6001 inches. There are many such functions for the use of a sine-bar, such as finding and checking angles, measuring angles and tapers and to determine center distances etc. The aforesaid conventional use of gage-blocks is replaced by using direct displacement gage-blocks as they are disclosed and claimed in U.S. Pat. No. 4,389,785 issued to Goldsmith et al June 23, 1983, entitled SINE-BAR GAGE BLOCKS AND DIRECT READING MICROMETER ADJUSTMENT. The advantage of the direct displacement gage blocks is that the teadious reference to trig tables and the selection of numerous blocks is eliminated, thereby avoiding accident, mistake and resultant errors. With the present invention, conventional gage-blocks or said direct displacement gage-blocks can be employed in setting primary and secondary sine-bars at the required degree of angularity.

Sine-bars are precision devices for measuring angles accurately and to locate work at a desired angle to some true surface, preferably a surface plate or the like. Conventional sine-bars consist of a hardened ground and lapped steel bar which has accurately spaced cylindrical plugs of equal diameter attached to or near each end. The sine-bar usually has notched ends to receive the cylindrical plugs which are held firmly against angular faces of the notches, and so as to form a support projecting only from the bottom of the bar. The upper side of the usual sine-bar is flat and parallel to the axes of the two underlying plugs within very close limits. There are various forms of sine-bars and refinements carrying forward the sine-bar concept. In compound sine-plates, the work supporting secondary sine-plate has its own two plugs and employs the underlying primary sine-plate as a base. In any event, gage-blocks have been used for elevating these two sine-plates respectively, and it is an object of this invention to improve this situation by combining the primary and secondary sine-plates using two plugs common to these two sine-plates, for direct adjustment of both the primary and secondary sine-plates by means of direct displacement gage-blocks and/or by a direct reading micrometer adjustor for fine adjustment within the angularity of the first mentioned angular adjustment in degrees.

It is a general object of this invention to proivde a sine-bar which is variable in order to be adjusted within degrees, minutes and seconds, and to this end it is similar to compound sine-bars, in that it is characterized by primary and secondary sine bars or plates, each of which is individually set at an exact angle. However, compound sine-bar arrangements are cumbersome, and therefore it is an object of this invention to render primary and secondary sine-bars more compact and easy to use as a unit wherein common plugs are employed in combination with only two sine-plates, a primary sine-plate and a secondary sine-plate. In practice, there is one base plug and one altitude plug, and the two sine plates are combined with both plugs respectively.

Heretofore, primary and secondary sine-plates of compound sine-bars and the like have employed individual base plugs for each. It is an object of this invention to provide a single common base plug for combined primary and secondary sine bars or plates. With this invention the base plug functions both as a tangent support upon a surface plate or the like, and as a hinge between the primary and secondary sine-plate. It is also an object to provide a base plug that couples the primary and secondary sine plates together as a unit. And, it is still another object of this invention to provide anti-friction engagement of the base plug with the primary and secondary sine-plates and which eliminates line contact therewith.

Heretofore, primary and secondary sine-plates of compound sine-bars and the like have employed individual altitude plugs, or the equivalent, for each. It is an object of this invention to provide a single common altitude plug, for combined primary and secondary sine bars or plates. With this invention the altitude plug functions both as a tangent support upon one or more gage blocks or the like, and as a tangent support between the primary and secondary sine-plates. It is also an object to provide an altitude plug that accomodates the primary support gage blocks while simultaneously supporting the secondary sine-plate adjuster means as hereinafter described. And it is still another object of this invention to provide anti-friction engagement of the altitude plug with the adjuster means of the secondary sine-plate and which eliminates scrubbing line contact therewith.

Micrometers take various forms, comprised generally of two visible elements and namely a barrel and a thimble, the barrel operating on a screw having forty threads per inch so that one revolution moves the baarrel and thimble one fortieth of an inch. A feature is the relationship of calibrations on one element relative to an index line on the other element. In normal practice, the barrel is provided with a straight axially disposed index line stepped off incrementally in calibrations spaced 0.025 inch, and the thimble with an edge overlying said index line and calibrated circumferentially into twenty-five equal parts. Thus, each line on the thimble represents one thousandths of an inch, while each calibration line on the barrel represents twenty-five thousandths of an inch. Heretofore, 11.5 threads per inch has been used to provide for one degree of thimble travel per turn, and this resolution can be employed here if so desired. However, it is an object of this invention to increase resolution and to provide an inside micrometer that reads in plus or minus degree of angle on the barrel as related to a sine-bar of which it is made a part, with degrees, minutes and seconds of angle being available as easily readable scaled indicia on the thimble. Accordingly, a high resolution screw having 45.84 threads per inch is provided so that one revolution moves the thimble one fortysixth of an inch, or 0.0218 inch. Characteristically therefore, we now provide a thimble that moves 15 minutes per revolution and which requires four turns or revolutions to move 60 minutes or a full degree. A feature of this thread pitch determination is that the thimble is of substantial diameter and is calibrated in 15 and 7½ second increments, or closer if desired, for greater resolution in angular settings. Reference is made to U.S. Pat. No. 4,238,888 issued to Goldsmith Dec. 16, 1980, entitled DIRECT READING MICROMETER FOR SINE-BAR ELEVATION wherein a micrometer of this typs employing a vernier scale is disclosed and which can be utilized here to provide precision second readings.

The various objects and features of this invention will be fully understood from the following detailed description of the typical preferred forms and applications thereof, throughout which description reference is made to the accompanying drawings, in which:

THE DRAWINGS

FIG. 4 is a side view of the improved combination primary and secondary sine-bars with a direct reading micrometer adjusting the secondary sine-bar within minutes and seconds.

FIG. 5 is a bottom view of the secondary sine-bar taken as indicated by line 5—5 on FIG. 4.

FIG. 6 is a transverse sectional view taken as indicated by line 6—6 on FIG. 4.

FIG. 7 is a longitudinal sectional view taken as indicated by line 7—7 on FIG. 5, And, FIG. 8 is a diagramatic layout of the barrel and thimble for the direct reading micrometer adjustable in minutes and seconds of sine-bar angularity.

PREFERRED EMBODIMENT

Figure 1:
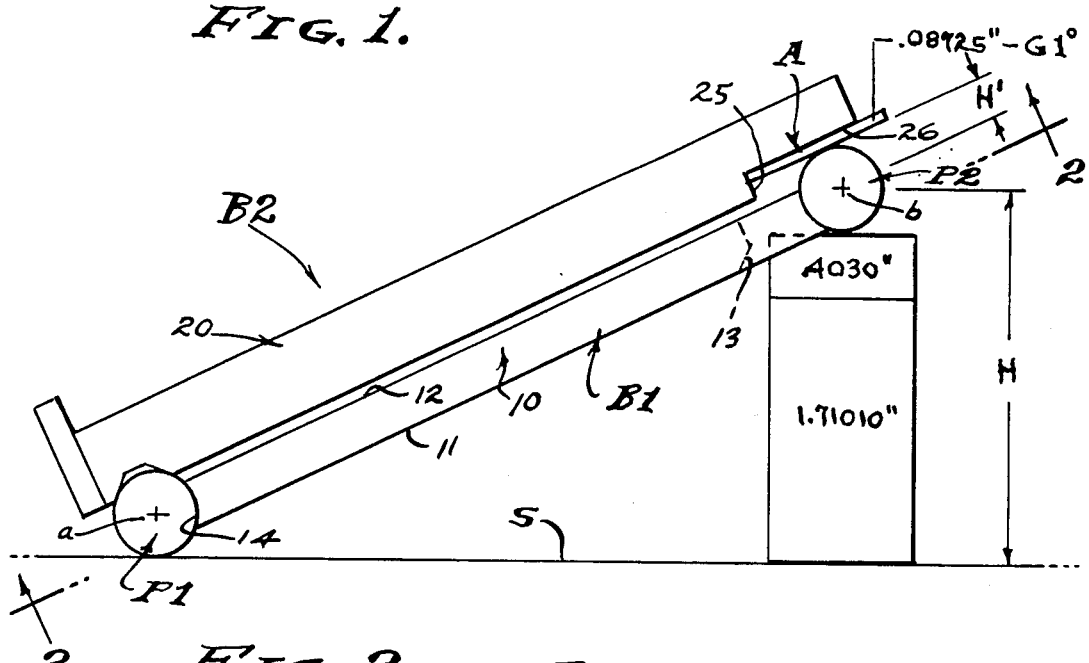
FIG. 1 is a side view of the combined primary and secondary sine-bars of the present invention elevated 25° and subject to minutes of angular adjustment.
Figure 2:
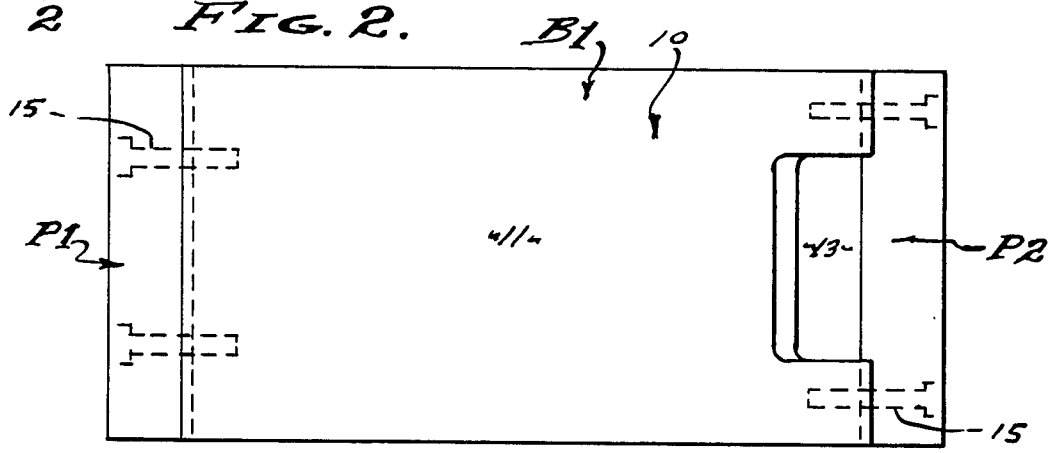
FIG. 2 is a bottom view of the primary sine-bar taken as indicated by line 2—2 on FIG. 1.

Gage-blocks and micrometers are direct reading devices for measuring distance, and it is both the inside measurement of height H between the flat surface S and a sine-bar altitude plug and the outside measurement of additional height H' with which this invention is concerned. As shown, we provide a variable sine-bar comprised of primary and secondary sine-bars B1 and B2 which share common spaced and parallel plugs, a base plug P1 and an altitude plug P2. A true surface S is provided as the flat reference plane for support of the plugs P1 and P2, a compound sine-bar to be angularly elevated according to accepted practice and standards with the vertical height offset H and H' as herein specified and disclosed.

This invention involves the sine-bar B1 to which the spaced plugs P1 and P2 are attached on spaced parallel axes disposed in a common plane. The axes a and b are spaced precisely five inches apart by a bar member 10 in the form of a plate of substantially lesser thickness than the equal diameters of the two plugs P1 and P2. Accordingly, the bottom face 11 of member 10 clears the surface S, and the top face 12 of member 10 is spaced well below the top plane of tangency extending between the plugs P1 and P2. In practice, the plugs P1 and P2 are 0.550 inch diameter and the bar member 10 is 0.300 inch thick with clearance above surface S of 0.050 inch. A feature is a central opening 13 in the bar member 10 adjacent to the plug P2, to accomodate the supporting gage-blocks or the like, as shown. There are concaved seats 14 to which the plugs P1 and P2 are secured to the opposite ends of the bar member 10, as by fastener means in the form of cap screws 15.

The sine-bar B1 is primary and is employed with the base plug P1 supported upon the surface S and with the altitude plug P2 elevated by means of gage blocks to height H, either those of conventional design or the aforementioned direct displacement blocks as disclosed in U.S. Pat. No. 4,389,785. The elevation of the altitude plug P2 provides the primary angularity in a known and determined number of degrees. It will be observed that both the base plug P1 and altitude plug P2 are exposed upwardly for the engaged reception of the secondary sine-bar B2 as next described.

Figure 9:
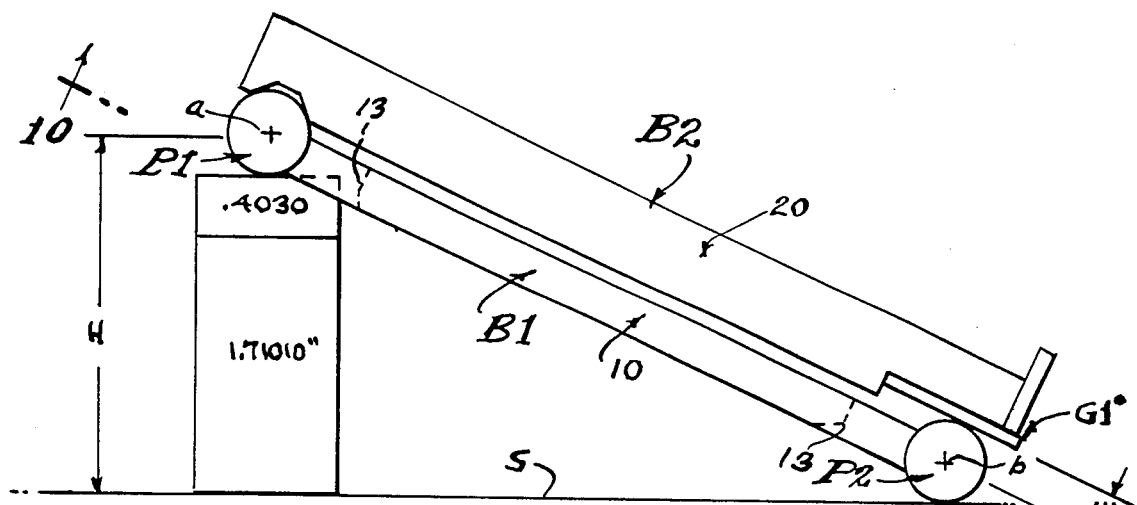
FIG. 9 is a view similar to FIG. 1, showing a reversible primary sine-bar, wherein the primary and secondary sine-bars are employed end for end as may be required. And, FIG. 10 is a bottom view of the primary sine-bar taken as indicated by line 10—10 on FIG. 9
Figure 10:
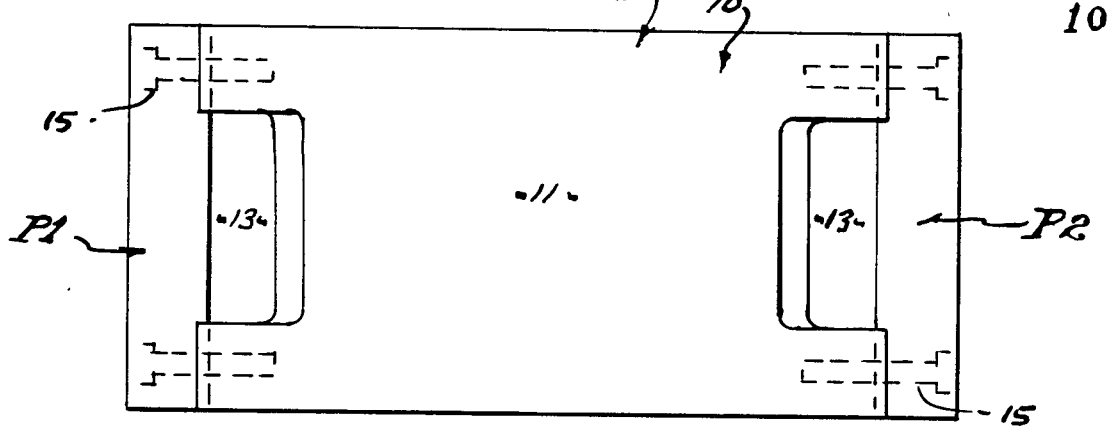

It is to be observed that the primary sine-bar B1 is reversible, whereby either plug P1 or P2 can be raised by means of gage-blocks over the true surface S. Accordingly, the displacement of the secondary sine-bar B2 is also from either plug P1 or P2 as may be required. As shown in FIGS. 9 and 10 of the drawings, a central opening 13 is provded adjacent each plug P1 and P2 so as to accomodate the supporting gage-block or the like, whereby either plug can be raised over the true surface.

The sine-bar B2 is secondary and employed by its supported engagement upon the two plugs P1 and P2, directly upon the base plug P1 and indirectly through adjustment means A upon the altitude plug P2. The sine-bar B2 coextensively overlies the sine-bar B1 and is engaged with the plugs P1 and P2 to be angularly elevated thereby to the additional height H'. In practice, the H' elevation is plus or minus one degree within which minute and second positioning is made by the adjustment means A. For example, one end of the sine-bar B2 can be notched in the conventional manner to rest over the base plug P1 to pivot thereon, while the other end of the sine-bar B2 can be elevated from the altitude plug P2 by alternate adjustment means A or A' as later described.

As shown herein, the sine-bar B2 is hingedly coupled to the base plug P1 and thereby to the sine-bar B1. As above described, the base plug P1 is attached to the sine-bar B1, with its upper periphery exposed and upon which the sine-bar B2 can bear with freedom to move angularly upwardly and downwardly. A transverse saddle 16 is provided at the underside of the sine-bar B2, for example having a 120° bearing surface rotatable about the axis a. Note that angular movement about this bearing engagement is plus or minus 1° only. Accordingly, coupled attachment of the sine-bar B2 to the sine-bar B1 is within the hinged engagement at base plug P1. The preferred attachment is by means of a tension spring 17 of helical form threaded radially into the plug P1 and projecting therefrom and into the the bar member 20 of sine-bar B2 where it is anchored by a screw 18 depending within said member and threaded into the spring 17.

The sine-bar B2 is aligned with sine-bar B1 by alignment means C independent of the above described spring tensioned attachment. The preferred alignment means C is a pin 21 projecting from one member and engaged with a slot in the other member. As shown, the pin 21 projects upwardly from the top 12 of bar member 10 to slideably engage in a vertical longitudinally disposed slot 22 open at the bottom 23 of the bar member 20. Accordingly, transverse movement between members 10 and 20 is checked while permitting the several degrees of angular displacement thereof.

Figure 3:
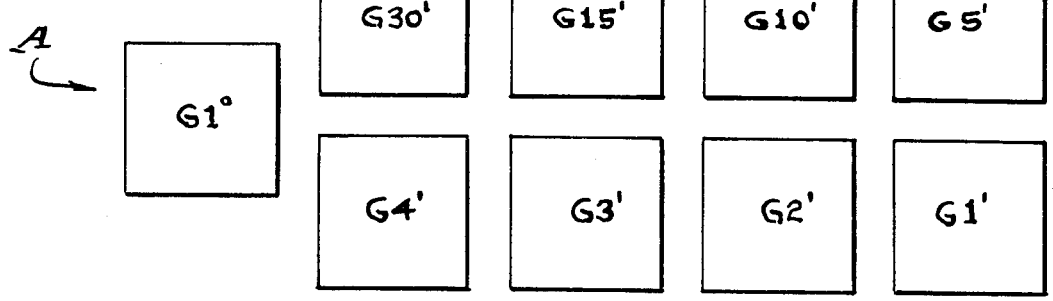
FIG. 3 is a layout view of the set of direct displacement gage-blocks for use in adjusting the secondary sine-bar in minutes (and in seconds when desired).

The basic form of adjustment means A is shown in FIGS. 1 and 3, and involves the use of gage-blocks for adjusting the height H' within an angularity of plus or minus 1°. A system of direct displacement blocks can be employed as disclosed in U.S. Pat. No. 4,389,785, or as shown a system of conventional gage-blocks G1°-G30' is employed as provided by the fllowing table:

| H' BLOCK HEIGHT TABLE | |
|---|---|
| 1° = .08275 | |
| 30' = .04365 | 4' = .0058 |
| 15' = .02180 | 3' = .00435 |
| 10' = .01455 | 2' = .0029 |
| 5' = .00725 | 1' = .00145 |

In practice, 2° angular displacement is all that is needed to adjust the sine-bar B2 from the plug P2 supported at an even degree increment as hereinabove described. It is preferred that the angular adjustment be within a range of plus or minus 1 degree, although the range of degrees can be varied or greater as may be required. The preferred arrangement is to provide a null position where the even degree of height H is controlling, and from which null position the sine-bar B2 can be lowered or raised in increments of 1 minute. Accordingly, the set of gage blocks G1°-G30' (per the table above) are combined to add or subtract from the null height H'. For example, use of the 1° block establishes said null height H', to which any one or a combination of the other blocks are added to increase the height H' by one minute increments. Alternately, the 1° block is removed and only one or a combination of the other blocks are added to decrease the height H' in one minute increments.

In accordance with this invention and basic use of the gage blocks G1°-G30', the bar member 20 of sine-bar B2 is provided with a step 25 having a downwardly disposed face 26 in a plane tangent to and coincidental with the plug P1, said face overlying the plug P2. Accordingly, any one or a combination of gage blocks G1°-G30' are placed between said face 26 and engaged tangentially with the plug P2 to establish the required height H' in one minute increments. Thus, a degree and minute angularity is quickly established by the combined sine-bars B1 and B2 set at the heights H and H'.

The precision form of adjustment means A is shown in FIGS. 4, 5 and 6, and involves a high resolution micrometer M which establishes degree, minute and second increments of height H'. The micrometer M is shown in the form of a pair of telescopically arranged elements, including a barrel X and thimble Y with a calibrated sleeve Z. The thimble sleeve is rotatable over the barrel, all of which are coaxially related so as to be employed in vertical alignment normal to the plane of sine-bar B2 which is tangent to and coincidental with the periphery of plug P1. Accordingly, the micrometer M is essentially an extensible right cylinder of substantial diameter characterized by telescopically related barrel and thimble elements positioned by an extension screw 30. In accordance with this invention, the barrel X is a fixed extension of the sine-bar B2 and the thimble Y carries an anvil in the form of a flat plate 31 extended by the screw to be supported by the periphery of the plug P2.

The barrel X is in the nature of a flattened disc secured by screw fasteners to the underside of the sine-bar B2 and located directly over the plug P2. The outer cylinder wall 21 of barrel X carries the index line (and vernier lines when employed) as later described, and is two inches in diameter and internally threaded to receive the extension screw of the thimble Y. As shown, the periphery of the thimble Y is knurled or the like, for manual engagement.

The thimble Y is in the nature of a cup telescopically rotatable over the barrel with working clearance. The calibrated sleeve Z is rotatably adjustable on the thimble Y and held positioned thereto by one or more screw fasteners 32 with slotted engagement through the rim of the sleeve. The sleeve Z is tapered to an upper peripheral edge marked with minutes and seconds of indicia-calibrations, as later described.

The extension screw 30 is a right cylinder adapted to threadedly engage into the barrel X. To this end the exterior of the screw 30 is provided with a number of threads per inch that equals one angular degree of rise or fall for one or more revolutions thereof as related to length of the sine-bar involved. The increment or rotation can be, for example, one full turn or four full turns thereof for each degree of rise or fall of sine-bar B2. The length of the sine-bars shown is five inches in each case, and in which case 11.46 threads per inch is employed so as to provide exactly one degree of sine-bar displacement from 0° to 1° plus or minus when rotating the thimble 360° one way or the other, in which case the periphery of the sleeve Z is calibrated in minute increments only (not shown). However, in the high resolution form of micrometer adjustment disclosed, the thread lead of the screw 30 is 45.84 threads per inch so as to provide four turns thereof for each degree of sine-bar displacement for 0° to 1° plus or minus, in either direction of rotation. By providing exactly 45.84 threads per inch the displacement from 0° to 1° plus or minus is precisely accurate. In practice however, displacement is not carried beyond plus or minus one degree.

Referring now to the barrel X and to the calibration of the vertical index line 40, the thread lead of screw 30 precisely determines the ever increasing or decreasing increments corresponding to each degree of rise or fall in relation to angular displacement of the sine-bar B2. With the high resolution thread of 45.84 pitch, each four turns of thimble Y extends the anvil 31 one exact degree. And, each single turn of the thimble Y extends the anvil 31 exactly fifteen minutes. Accordingly, the periphery of the sleeve Z is calibrated in minutes and seconds, there being fifteen minute indicia lines marked "1" to "0" (15'), and intermediate second indicia lines as shown. In practice, the second indicia lines are in 15" and 7½" increments, between which reasonably accurate interpolation can be made. Thus, a degree, minute and second angularity is quickly and accurately established by the combined sine-bars B1 and B2 set at the heights H and H'.

The anvil plate 31 can be carried by the thimble Y to rotate therewith according to conventional practice, however this causes frictional scrubbing engagement thereof with the periphery of the supporting plug P2, and line contact wear along the plug. Therefore, antiscrub means in the form of loose pinned engagement of the anvil with both the thimble Y and plug P2 is provided. The anvil plate 31 is a flat disc with parallel top and bottom faces to engage precisely with the flat bottom face 33 of the thimble and with the top periphery of the plug. A centering pin 34 enters a bearing opening in the center of the thimble to rotate therein. And, an anchor pin 35 enters an anchor opening in the top of plug P2, offset from the pin 34 at a precise radius, to prevent turning of the anvil 31 relative to the plug. The anchor pin 35 fits loosely in the anchor opening so as to permit rocking motion thereof within the several degrees of angular displacement of sine-bar B2.

In order to maintain the sine-bars B1 and B2 as a unit, and to prevent displacement of the anvil 31 therefrom, the two sine-bars are yieldingly urged together by spring means S coupled therebetween. As shown, a tension spring 36 is anchored into the two sine bars to extend therebetween, thereby maintaining pressured engagement between the thimble Y and plug P2, with the anvil plate 31 pressed therebetween to be captured in working position.

Having described only the typical preferred forms and applications of our invention, we do not wish to be limited or restricted to the specific details herein set forth, but wish to reserve to ourselves any modifications or variations that may appear to those skilled in the art as set forth within the limits of the following claims.

We claim:

1. In combination;
    a primary sine-bar comprised of a base plug for support upon a true surface and an altitude plug for support offset from said true surface, the plugs being held on spaced parallel axes by a bar member extending therebetween,
    a secondary sine-bar comprised of a bar member coextensively overlying the primary sine-bar with one end having direct supported engagement upon the base plug of the primary sine-bar and its other end overlying the altitude plug of the primary sine-bar,
    and adjustment means disposed between the altitude plug and the overlying end of the secondary sine-bar to adjust a height established by support of the altitude plug offset from said true surface.

2. The primary and secondary sine-bar combination as set forth in claim 1, wherein the bar member of the primary sine-bar is of lesser thickness than the diameter of either plug with clearance thereof offset from the supporting true surface.

3. The primary and secondary sine-bar combination as set forth in claim 1, wherein the bar member of the primary sine-bar is of lesser thickness than the diameter of the base plug and altitude plug with clearance thereof beneath a plane of tangency extending between the two plugs.

4. The primary and secondary sine-bar combination as set forth in claim 1, wherein the bar member of the secondary sine-bar has a bearing coaxially engageble with the base plugs of the primary sine-bar.

5. The primary and secondary sine-bar combination as set forth in claim 4, wherein the bearing coaxially engageable with the base plug is a hinge coupling means between the bar member of the secondary sine-bar and said base plug of the primary sine-bar.

6. The primary and secondary sine-bar combination as set forth in claim 4, wherein the bearing coaxially engageable with said base plug is comprised of a saddle on the bar member of the secondary sine-bar and supportably engaged upon said base plug and rotatable angularly thereon.

7. The primary and secondary sine-bar combination as set forth in claim 6, wherein coupling means comprised of a spring extends from the saddle of the bar member of the secondary sine-bar and is anchored into the base plug.

8. The primary and secondary sine-bar combination as set forth in claim 1, wherein the bar member of the primary sine-bar has an opening adjacent to at least the altitude plug to accomodate a supporting gage-block and the like.

9. The primary and secondary sine-bar combination as set forth in claim 1, wherein the bar member of the primary sine-bar is of lesser thickness than the diameters of the base plug and the altitude plug with clearance thereof over the supporting true surface and with clearance thereof beneath a plane of tangency extending over and between the two plugs, wherein the bar member of the secondary sine-bar has a bearing coaxilly engageable with the base plug of the primary sine-bar, and wherein the bar member of the primary sine-bar has an opening adjacent to at least the altitude plug to accomodate a supporting gage-block and the like.

10. The primary and secondary sine-bar combination as set forth in claim 1, wherein longitudinal alignment of the primary and secondary sine-bars is by means of a pin extending from the bar member of one sine-bar and slideably engaged in a longitudinally disposed slot in the bar member of the other sine-bar.

11. The primary and secondary sine-bar combination as set forth in claim 1, wherein the primary and secndary sine-bars are drawn together by means of a spring extending between and anchored into each of the bar members of the two sine-bars.

12. The primary and secondary sine-bar combination as set forth in claim 1, wherein the bar member of the primary sine-bar has an opening adjacent to each one of the plugs to accomodate a supporting gage-block and the like, whereby either plug can be offset from said true surface.

13. In combination;
    a primary sine-bar comprised of a base plug for suport upon a true surface and an altitude plug for support offset from said true surface, the plugs being held on spaced parallel axes by a bar member extending therebetween,
    a secondary sine-bar comprised of a bar member coextensively overlying the primary sine-bar with one end having direct supported engagement upon the base plug of the primary sine-bar and its other end having a face parallel to a plane of tangency with and extending from the base plug of the primary sine-bar and overlying the altitude plug of the primary sine-bar, and adjustment means disposed between said altitude plug and the overlying face of the secondary sine-bar to adjust a height established by support of the altitude plug offset from said true surface.

14. The primary and secondary sine-bar combination as set forth in claim 13, wherein the bar member of the primary sine-bar has an opening adjacent to each one of the plugs to accomodate a supporting gage-block and the like, whereby either plug can be offset from said true surface.

15. The primary and secondary sine-bar combination as set forth in claim 13, wherein the adjustment means is comprised of a least one gage block removeably inserted between the face of the bar member of the secondary sine-bar and said altitude plug of the primary sine-bar to adjust the height established by support of the altitude plug offset from said true surface.

16. The primary and secondary sine-bar combination as set forth in claim 13, wherein the adjustment means is comprised of at least one gage block removeably inserted between the face of the bar member of the secondary sine-bar and said altitude plug of the primary sine-bar in height increments to adjust by minutes the height established by support of the altitude plug offset from said true surface.

17. The primary and secondary sine-bar combination as set forth in claim 13, wherein the adjustment means is comprised of at least one gage block removeably inserted between the face of the bar member of the secondary sine-bar and said altitude plug of the primary sine-bar in height increments to adjust by minutes and seconds the height established by support of the altitude plug offset from said true surface.

18. In combination;
a primary sine-bar comprised of a base plug for support upon a true surface and an altitude plug for support offset from said true surface, the plugs being held on spaced parallel axes by a bar extending therebetween, a secondary sine-bar comprised of a bar member coextensively overlying the primary sine-bar with one end having direct supported engagement upon the base plug of the primary sine-bar and its other end overlying the altitude plug of the primary sine-bar, and micrometer adjustment means disposed between said altitude plug and the overlying end of the secondary sine-bar and calibrated in parts of a degree of sine-bar angularity to adjust a height of degrees of angle of sine-bar angularity established by support of the altitude plug offset from said true surface.

19. The primary and secondary sine-bar combination as set forth in claim 18, wherein the micrometer adjustment means has an anvil in a plane of tangency with said altitude plug of the primary sine-bar when the calibrations thereof are in a null position from which height is adjusted.

20. The primary and secondary sine-bar combination as set forth in claim 18, wherein the micrometer adjustment means has an adjustable thimble rotatably engaged with an anvil having a face in a plane of tangency with said altitude plug of the primary sine-bar when the calibrations thereof are in a null position from which height is adjusted and having an offset pin engaged in the said altitude plug of the primary sine-bar to prevent turning of the anvil.

21. The primary and secondary sine-bar combination as set forth in claim 18, wherein the micrometer adjustment means has an adjustable thimble with an anvil coaxially and rotatably pinned thereto and having a face in a plane of tangency with said altitude plug of the primary sine-bar when the calibrations thereof are in a null position from which height is adjusted and having an offset pin engaged in the said altitude plug of the primary sine-bar to prevent turning of the anvil.

22. The primary and secondary sine-bar combination as set forth in claim 18, wherein the micrometer adjustement means is comprised of a barrel calibrated in degrees of sine-bar angularity and of a thimble extended by a thread of uniform pitch and calibrated in minutes of sine-bar angularity.

23. The primary and secondary sine-bar combination as set forth in claim 18, wherein the micrometer adjustment means is comprised of a barrel calibrated in degrees of sine-bar angularity and of a thimble extended by a thread of uniform pitch and multiple turns per degree of sine bar angularity and the thimble being calibrated in minutes and seconds of sine-bar angularity.

24. The primary and secondary sine-bar combination as set forth in claim 18, wherein the micrometer adjustment means is comprised of a barrel calibrated in degrees of sine-bar angularity and of a thimble extended by a thread of uniform 11.46 threads per inch pitch and with a single turn per degree of sine-bar angularity and the thimble being calibrated in minutes of sine-bar angularity.

25. The primary and secondary sine-bar combination as set forth in claim 18, wherein the micrometer adjustment means is comprised of a barrel calibrated in degrees of sine-bar angularity and of a thimble extended by a thread of uniform 45.85 threads per inch pitch and with four turns per degree of sine-bar angularity and the thimble being calibrated in minutes and seconds of sine-bar angularity.

26. The primary and secondary sine-bar combination as set forth in claim 18, wherein the bar member of the primary sine-bar has an opening adjacent to each one of the plugs to accomodate a supporting gage-block and the like, whereby either plug can be offset from said true surface.

* * * * *